United States Patent [19]
Yorgiadis

[11] 4,203,318
[45] May 20, 1980

[54] STRAIN GAGE LOAD CELL

[76] Inventor: Alexander Yorgiadis, 12 Union Hill Rd., W. Conshohocken, Pa. 19428

[21] Appl. No.: 934,190

[22] Filed: Aug. 16, 1978

[51] Int. Cl.² ............................................. G01L 1/22
[52] U.S. Cl. ..................................... 73/141 A; 338/5
[58] Field of Search ............... 73/141 A, 136 A, 781, 73/782, 761; 338/5, 6

[56] References Cited

U.S. PATENT DOCUMENTS

| | | | |
|---|---|---|---|
| 3,201,977 | 8/1965 | Kutsay | 73/141 A X |
| 3,672,213 | 6/1972 | Watson | 73/136 A |
| 3,800,591 | 4/1974 | Tveter | 73/136 A |
| 3,855,857 | 12/1974 | Claycomb | 73/133 R X |
| 3,911,737 | 10/1975 | Ormond | 73/141 A |

*Primary Examiner*—Charles A. Ruehl
*Attorney, Agent, or Firm*—Eugene E. Geoffrey, Jr.

[57] ABSTRACT

A strain gage load cell having a primary load carrying member subjected to deformation under stress, a secondary load carrying member affixed to the primary load carrying member in bridging relationship and having a portion of reduced section substantially shorter than the primary load carrying member and a strain gage affixed to said portion of reduced section of said secondary load carrying member.

5 Claims, 10 Drawing Figures

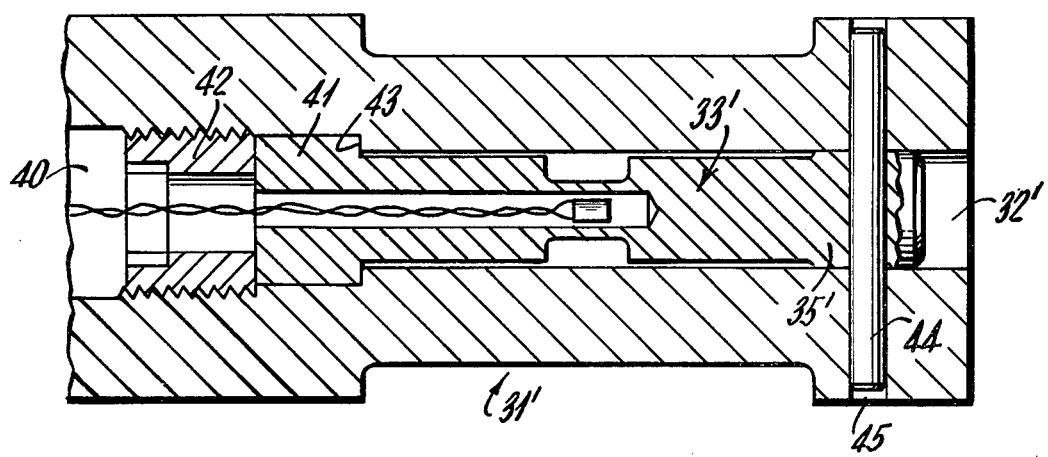
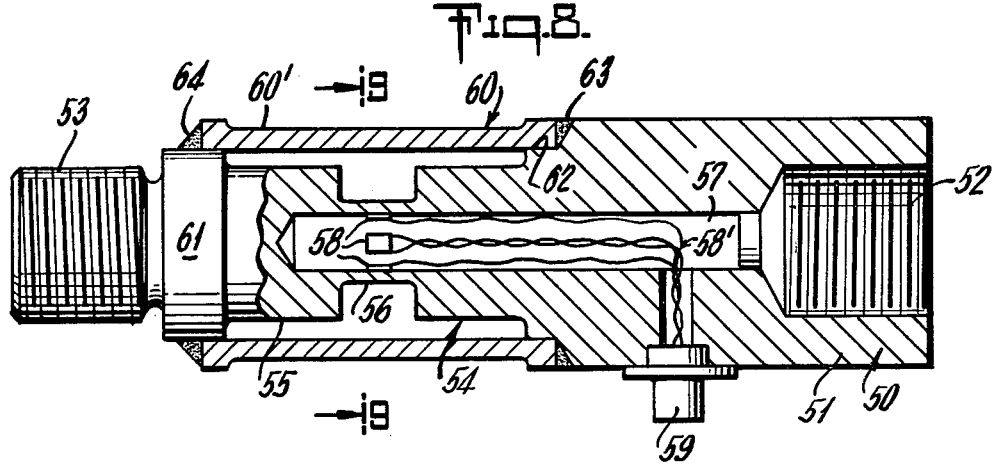
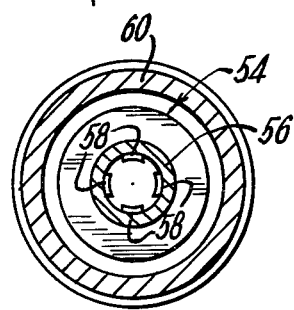
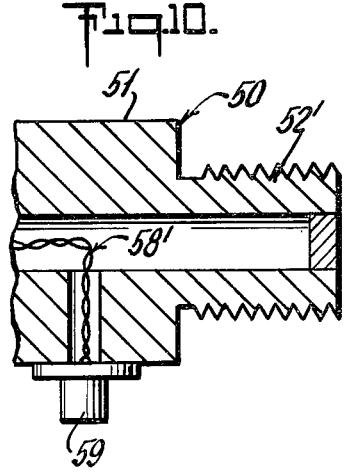

STRAIN GAGE LOAD CELL

This invention relates to strain gage load cells for measuring loads by sensing the deformation of load carrying members having strain gages therein and more specifically to a novel and improved load cell wherein the strain gage is mounted within the cell in such a manner that the deformation of a load cell under a stress or strain will be amplified before application to the strain gage. With this arrangement, both a high sensitivity and a high factor of safety are obtained.

Load cells which are incorporated in machinery or other structures for measuring stresses and strains are required to have safety factors consistent with the safety factors for the remainder of the structure. In critical applications where high factors of safety are required the allowable stresses and strains in the load cell must be kept low and this will result in a material reduction in the sensitivity of the load cell. This occurs by reason of the fact that a load cell is in the shape of an elongated member having an opening formed therein and strain gages affixed to the wall of the opening in such a manner that they can detect elongation and compression of the member. Thus, in cases where exceedingly high safety factors are required there is a consequent loss of sensitivity which results in a loss of accuracy because of the necessity for measurement of exceedingly low signals.

This invention overcomes the aforementioned difficulties and provides a novel and improved load cell wherein the stresses and strains of the principal load carrying member are amplified substantially before application to the strain gage. In this way, substantially increased sensitivity is attained and at the same time a high factor of safety can be maintained.

Another object of the invention, resides in a provision of a novel and improved strain gage type of load cell capable of operating over a wide range of loads with a relatively high degree of accuracy.

Still another object of the invention resides in the provision of a novel and improved load cell having high sensitivity and at the same time being able to withstand high overloads without structural failure.

The load cell in accordance with one embodiment of the invention comprises an elongated element having a portion of reduced section within which the stresses and strains are essentially confined. The element has an opening extending therethrough and a secondary load carrying member is secured within the opening with the ends of the secondary member being suitably secured to the primary load carrying member and in a position spanning the area of reduced section. The secondary load carrying member has a relatively narrow area of reduced section and an opening extending through the secondary member is arranged to carry a strain gage disposed within the reduced section of the secondary member. With this arrangement, the elongation or compression, as the case may be, of the reduced section of the primary member when under stress is also experienced by the very much shorter reduced section of the secondary member. Since the strain gages are mounted on or within the reduced section of the secondary member and since the elongation or compression of such reduced section is greater per unit length than in the reduced section of the primary member there is in effect an amplification of the stresses and strains which affords a relatively high degree of sensitivity.

The above and other objects of the invention will become more apparent from the following description and accompanying drawings forming part of this application.

IN THE DRAWINGS

FIG. 7 is a fragmentary cross-sectional view of still another embodiment of the invention.

FIG. 8 is a cross-sectional view of a further embodiment of the invention showing still another structural arrangement for obtaining increased sensitivity through the use of primary and secondary load carrying members.

FIG. 9 is a cross-sectional view of FIG. 8 taken along the line 9—9 thereof; and FIG. 10 illustrates modified connecting means that may be utilized on the form of the invention shown in FIG. 8.

Figure 1:
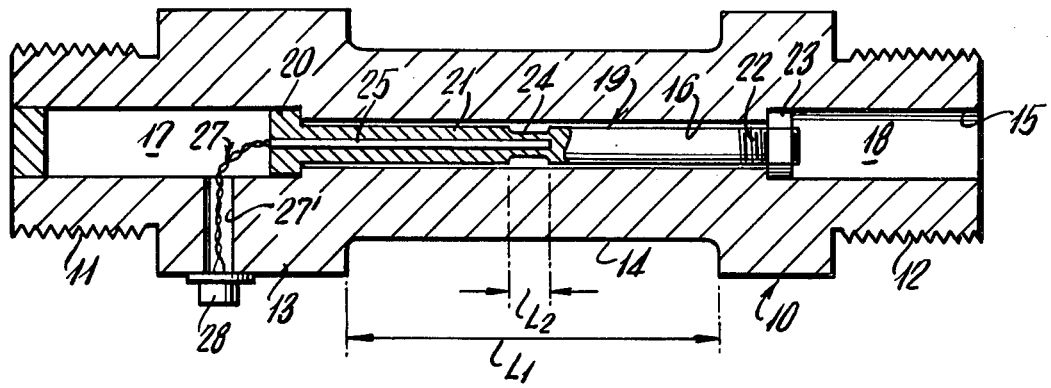
FIG. 1 is a cross-sectional view of a strain gage type load cell in accordance with one embodiment of the invention and shows the primary and secondary load carrying members.
Figure 2:
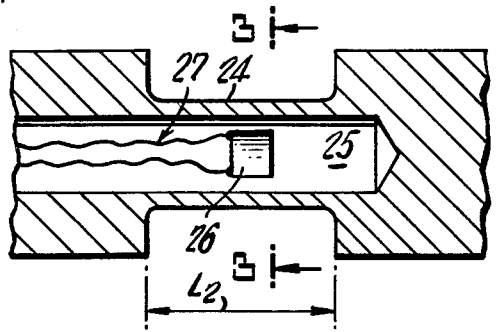
FIG. 2 is an enlarged cross-sectional view of a fragmentary portion of the secondary load carrying member of FIG. 1.
Figure 3:
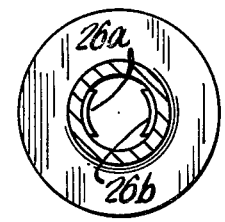
FIG. 3 is a cross-sectional view of FIG. 2 taken along the lines 3—3 thereof.

Referring now to the drawings and more specifically to FIGS. 1 through 3 illustrating one embodiment of a load cell in accordance with the invention. The load cell is an elongated structure generally denoted by the numeral 10 and having threaded end portions 11 and 12 for fastening the cell to structural elements wherein tension or compression loads are to be measured. While external threaded sections 11 and 12 are illustrated, it is evident that internally threaded couplings may be employed and even flange couplings which have a plurality of openings in the flange for accommodating bolts in order to affix the flange to a cooperating flange member.

The body 13 of the load cell 10 has an elongated section 14 of reduced diameter and a length $L_1$. The center of the body 13 has an opening 15 extending therethrough with the central portion 16 of the opening 15 being of slightly smaller diameter than the end portions 17 and 18. The length of the opening portion 16 should be equal to or preferably slightly greater than the length $L_1$ of the reduced section 14 of the body 13. A secondary load member generally denoted by the numeral 19 and is in the form of a bolt having a head portion 20, an elongated shank 21 and a threaded portion 22 for receiving a nut 23. The diameter of the shank 21 is slightly smaller than the diameter of the opening portion 16 in order to prevent friction between the shank 21 and the wall of the opening 16. A portion of the shank 21 of the bolt 19 has a reduced section 24 of a length $L_2$ which is substantially shorter than length of the reduced section $L_1$. The bolt 19 has a small opening 25 formed through the head 30 and shank 21 and extends preferably slightly beyond the reduced shank portion 24 as shown more clearly in FIG. 2. An electrical strain gage 26 is mounted within the opening 25 and preferably centrally of the reduced section 24. Lead wires 27 extend outwardly through the opening 25 and through an opening 27' in the body 13 of the primary load member and terminate in a suitable connector 28 to facilitate attachment to measuring equipment. While the strain gage 26 may take any suitable form, they may constitute one or more individual elements 26a and 26b as shown in FIG. 3.

While the load cell as described above can be used to measure compression as well as tension let it be assumed that it is subjected to a tension load of P pounds. This will produce a tensile stress over the entire load cell including the recessed portion $L_1$ which will elongate as a result of the stress. If the body 13 of the load cell is formed of steel, and the tensile stress is approximately 60,000 pounds per square inch, the portion $L_1$ will elongate by about 0.2%. If the strain gage were bonded to the wall of the opening 16 and the gage has a gage factor of approximately 2.0, the resulting change in resistance due to the load would be 0.4%.

With the invention, as illustrated in FIGS. 1 through 3, it will be observed that the reduced section 24 has a length $L_2$ considerably shorter than the reduced section $L_1$ of the body 13. It can be safety assumed that the elongation of the reduced section 24 will be at least 4 times as great as the elongation of the reduced section $L_1$ of the body 13. Thus, if the strain gages 26a and 26b are deformed by only 0.2% then the main load carrying member 13 would only be subjected to 15,000 pounds per square inch stress and the resistance change would still be 0.4%.

It is evident from the foregoing that a wide range of amplification factors are readily attainable and afford substantial increases in sensitivity, greater accuracy, and wide range operation which permit the load cell to be fabricated with a high factor of safety.

Figure 4:
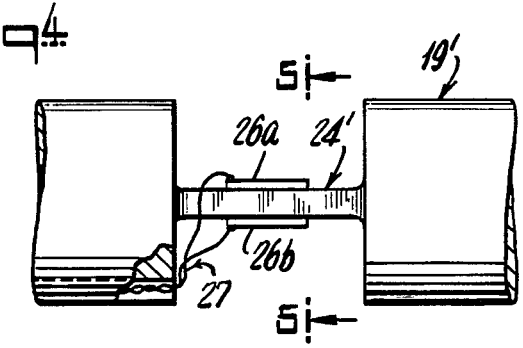
FIG. 4 is a modified embodiment of the secondary load carrying member as illustrated in FIG. 2.
Figure 5:
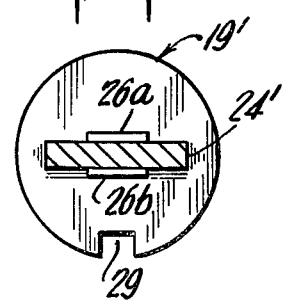
FIG. 5 is a cross-sectional view of FIG. 4 taken along the line 5—5 thereof.

A modified form of the secondary load member is illustrated in FIGS. 4 and 5 and generally denoted by the numeral 19'. It will be observed that in this embodiment of the invention that the reduced portion 24' has a thin rectangular section and the strain gages 26a and 26b are bonded to the surfaces thereof. With the use of the rectangular section 24', the member 19' is provided with a longitudinal groove 29 to accommodate the wires 27 coupling the strain gage to the connector 28.

Figure 6:
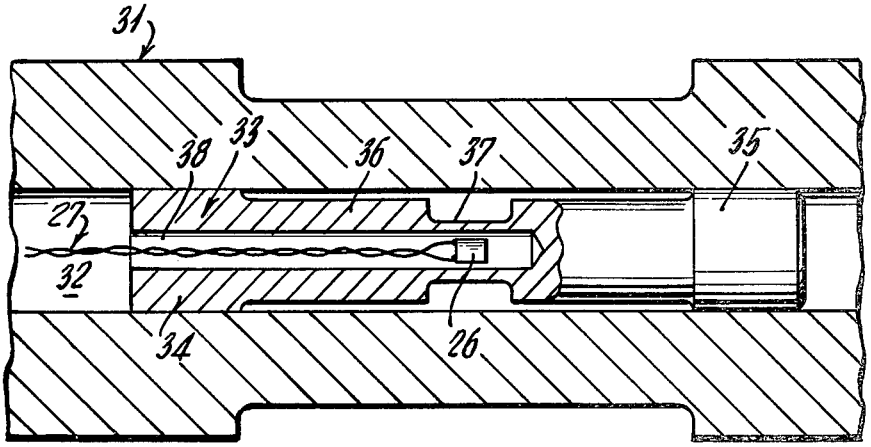
FIG. 6 is a fragmentary cross-sectional view of another embodiment of the invention showing the primary and secondary load carrying members.

FIGS. 6 through 10 illustrate modified embodiments of the invention shown in FIG. 1 for achieving amplification of the sensitivity of the load cell. In FIG. 6 the load cell is generally denoted by the numeral 31 and has a through hole 32 of uniform diameter. This corresponds to the hole in the body 13 of FIG. 1 and denoted by the portions 16, 17 and 18. In this embodiment of the invention, the secondary member 33 has end portions 34 and 35 snuggly fitting the opening 32 and an intervening portion 36 of slightly reduced diameter. A central part of the section 36 is substantially reduced in diameter and denoted by the numeral 37. It is within this section that the strain gages 26 are disposed. Installation of the strain gages may be accomplished by forming a central opening 38 within the member 33 in substantially the same manner as described in connection FIG. 1 and this opening also accommodates the wires 27 for connecting the strain gages to an external instrument. The end portions 34 and 35 can be secured within the opening 32 by any one of a variety of methods such as brasing, welding, soldering, epoxy bonding, diffusion bonding or shrinking in place.

FIG. 7 is similar to FIG. 6 and like primed numerals have been used to designate elements of FIG. 7 which correspond to those of FIG. 6. In the embodiment of the invention shown in FIG. 7 the left hand portion 40 of the through hole 32' is of slightly greater diameter to accommodate the enlarged head portion 41 of the secondary member 33'. A set screw 42 threadably engages the enlarged portion 40 of the opening 32' to urge the head 41 of the secondary member 33' against the shoulder 43. The opposing end portion 35' of the secondary member 33' is held in position by a pin 44 positioned within an opening 45 through the body 31' and the head portion 35'.

The embodiment of the invention illustrated in FIGS. 8 through 10 while differing in construction from the embodiments previously described nevertheless embodies the same principle of operation. In this embodiment of the invention, the load cell is generally denoted by the numeral 50 and comprises a body 51 having a female threaded end portion 52 and a male threaded end portion 53. The secondary load member generally denoted by the numeral 54, constitutes an integral part of the body 51 and includes a portion 55 of slightly reduced cross section and a portion 56 of substantially reduced cross section. An opening 57 is formed in the center of the body 51 and carries strain gages 58 disposed on the wall of the opening 57 and in alignment with the reduced portion 56. In this case, four strain gages 58 are illustrated though it is apparent that in each of the illustrated embodiments of the invention any desired number of gages may be utilized. The wires 58' from the four strain gages are attached to a connector 59 carried on the side of the body 51.

The primary load carrying member is denoted by the numeral 60 and is carried by a collar 61 adjoining the threaded end portion 53 and a shoulder milled into the body 51 adjoining the reduced portion 54 defining the secondary member. The primary load carrying member is fastened in position by welds 63 and 64.

With the foregoing arrangement, the major portion of the load is carried by the member 60 and its elongation or compression under stress is also experienced by the reduced section 56 with the result that amplified sensitivity is obtained in the same manner as with the previous embodiments of the invention. If desired, the principal load carrying member 60 may be provided with a reduced section 60' which has a length substantially equal to the length of the secondary load carrying member 54. In this way, the stresses will be essentially concentrated over the length of the reduced section 60' of the primary load carrying member and the elongation or contraction under load of the primary load carrying member 60' will also be evidenced within the length of the reduced section 56 of the secondary load carrying member 54.

While the form of the invention illustrated in FIG. 8 has a female end portion 52 and a male end portion 53, it is evident that the female end portion 52 could be fabricated in the form of a male end portion 52' as illustrated in FIG. 10. Other types of connectors may also be employed.

While only certain embodiments of the invention have been illustrated and described, it is understood that alterations, changes and modifications may be made without departing from the true scope and spirit thereof.

What is claimed is:

1. A strain gage load cell for sensing axial compression and elongation of load carrying members comprising a primary elongated load carrying member having a central axial opening extending lengthwise from at least one end thereof, said member having a portion of reduced section positioned between the ends thereof, said central opening extending beyond the ends of said portion of reduced section, a secondary load carrying member having a central section of slightly smaller diameter than said opening disposed within said opening and a length greater than the length of said portion of reduced section, said central section of said secondary member having a portion of reduced section with the length thereof being materially shorter than the length of the first said reduced section, the ends of said secondary member being fixedly secured to said primary load carrying member and at least one strain gage secured to a wall of the last said portion of reduced section whereby an amplified indication of axial strain is sensed by said strain gage with little if any error resulting from bending or torsional strains.

2. A strain gage load cell according to claim 1 wherein said secondary member includes a central opening extending from at least one end to a point beyond the portion of reduced section of said secondary member and said strain gage is affixed to the wall of the last said opening and in alignment with the portion of reduced section.

3. A strain gage load cell according to claim 1 wherein said portion of reduced section of said secondary member is of thin rectangular section and said strain gage is affixed to at least one surface of said rectangular section.

4. A strain gage load cell according to claim 1 wherein the opening in said primary member extends through said member and has enlarged end portions extending inwardly to points spaced outwardly from the first said portion of reduced section and forming shoulders, and said secondary member has an enlarged head portion on one end thereof and a threaded shank on the other end thereof, said head portion being seated against one shoulder and a nut threadably engaging said threaded shank and seated against the other shoulder.

5. A strain gage load cell according to claim 1 wherein the opening in said primary member has at least one end portion of enlarged diameter and forming a shoulder, said secondary member has an enlarged end portion snugly engaging said portion of enlarged diameter and seated against said shoulder and a pin extending through said primary member and the other end of said secondary member to secure the latter in position.

* * * * *